UNITED STATES PATENT OFFICE.

GEORGE HALE BRABROOK, OF TAUNTON, MASSACHUSETTS, ASSIGNOR TO THE REED & BARTON CORPORATION, OF SAME PLACE.

MOLD MATERIAL FOR CASTING METALS.

SPECIFICATION forming part of Letters Patent No. 667,488, dated February 5, 1901.

Application filed July 23, 1900. Serial No. 24,627. (No specimens.)

*To all whom it may concern:*

Be it known that I, GEORGE HALE BRABROOK, of Taunton, in the county of Bristol and State of Massachusetts, have invented a new and useful Improvement in Mold Material for Casting Metals, of which the following is a specification.

My invention has relation to improvements in mold material for casting metals; and the object thereof is to provide a mold for the purpose mentioned whereby sharply-defined contours and delicately-delineated patterns can be certainly and perfectly reproduced in the mold.

With this object in view the invention consists in a mold material composed of plaster-of-paris and mica scales.

The invention also consists in a mold composed of plaster and mica scales. It is well known in the art that a mold of this kind must embody antiphlogistic characteristics or qualities to resist the exposure to heat for drying it, as well as to resist without injury the introduction and contact of the molten metal, and associated with these heat-resisting and durable qualities the composition must be of a porous consistency to permit the escape of gases generated and released by the introduction of the molten metals.

To accomplish the purposes of the invention and produce a mold possessed of the essential qualities above specified, I take of plaster-of-paris the required quantity and mix water therewith until the mixture is of a desired consistency and the elements thoroughly incorporated. I then take mica scales or finely-ground mica scales and mix them with water to about the consistency of a thick but pliable mass. To substantially three parts of the plaster-of-paris mixture I add about one part of the mica scales, and the mass is then thoroughly stirred until uniform and complete incorporation is attained. The mixture thus made is then applied and cast on the pattern or parts of the pattern of which the mold is to be taken or made in a manner well known to the trade or art. When the requisite molds have thus been made, they are placed in a drying-oven and subjected to a moderate heat—say from 250° to 300° Fahrenheit—for from ten to twelve hours, more or less, the drying process effecting the evaporation of the greater portion of the water and rendering the molds apparently dry. The heat in the oven is then slowly and gradually increased until a temperature of about 1,000° Fahrenheit is attained, and maintained in its application to the forms or molds for from two to three hours, when the heat is allowed to gradually decrease and the molds to slowly cool. The molds are then ready to receive the casting. A mold thus produced and composed of the ingredients named is of the highest degree of perfection and particularly adapted for producing small sharp castings, and also castings of considerable surface but thin and light in body.

I am well aware that molds have heretofore been made of plaster-of-paris mixed with various substances intended to strengthen the mold and give it sharply-defined and smooth surfaces; but I believe I am the first to make and use a mold composition composed of a plaster or plaster-of-paris and mica scales prepared in the manner set forth. A mold composed of the ingredients named in my formula possesses great strength and will withstand all the exigencies of the service to which ordinarily subjected. The mica scales act as a binder to the plaster, and its indestructibility by heat renders the mold durable beyond any other that I am acquainted with. The surface of the mold is especially smooth and hard and the molten metals lie in complete impact therewith, so that a perfect casting of the pattern is obtained.

It is apparent that the object of the invention may be accomplished by substituting other ingredients in place of the plaster-of-paris, such as common lime-and-sand plaster or the equivalent, and the mica scales incorporated therein. Such a composition could be utilized in the production of castings of less delicate outlines and design than those produced by the molds of plaster-of-paris and mica scales.

It will be understood that I may utilize the mica scales in their natural state without reducing them to a powdered or pulverized condition.

What I claim is—

1. A mold material to receive metal castings, composed of plaster-of-paris and mica scales, substantially as described.

2. A mold material to receive metal castings, composed substantially of three parts plaster-of-paris and one part mica scales, substantially as described.

In testimony whereof I have signed my name to this specification, in the presence of two subscribing witnesses, on this 12th day of July, A. D. 1900.

GEO. HALE BRABROOK.

Witnesses:
E. R. HICKS,
BENJ. B. PIERCE.